(No Model.) 2 Sheets—Sheet 1.
S. F. DUNCAN.
CLAMPING DEVICE.
No. 373,770. Patented Nov. 22, 1887.
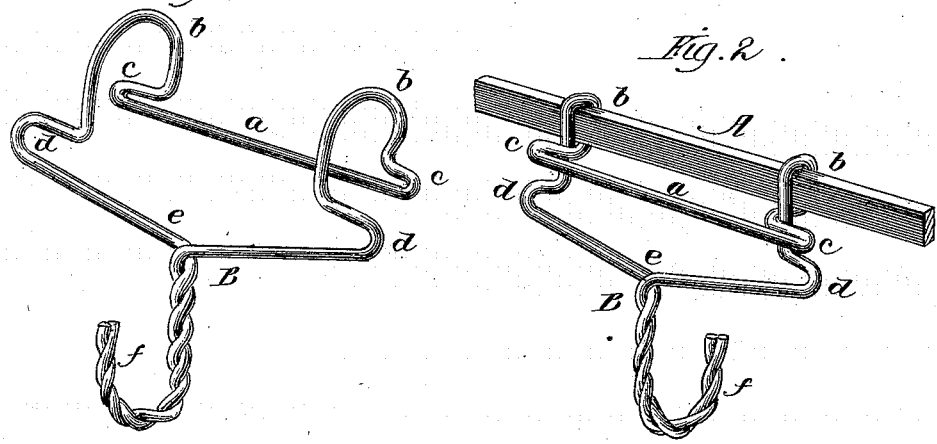
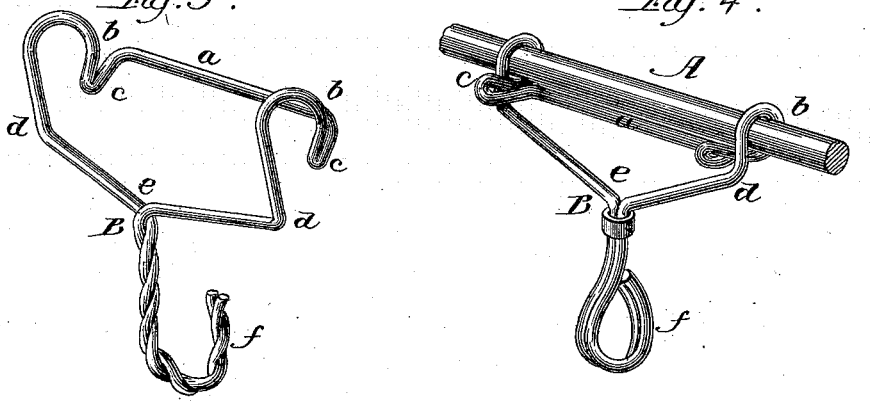
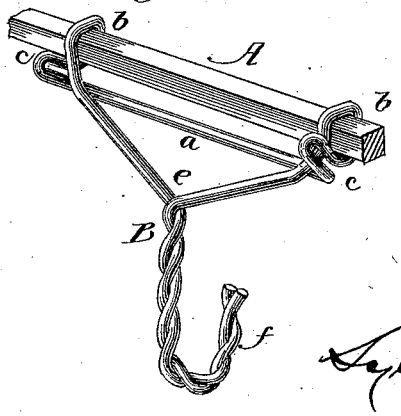
Witnesses:
O. W. Bond
Harry T. Jones
Inventor:
Sylvester F. Duncan (No Model.) 2 Sheets—Sheet 2.

S. F. DUNCAN.
CLAMPING DEVICE.

No. 373,770. Patented Nov. 22, 1887.

Witnesses:
A. W. Bird.
Harry T. Jones.

Inventor:
Sylvester F. Duncan.

UNITED STATES PATENT OFFICE.

SYLVESTER F. DUNCAN, OF CHICAGO, ILLINOIS, ASSIGNOR TO THE WIRE FENCE IMPROVEMENT COMPANY, OF SAME PLACE.

CLAMPING DEVICE.

SPECIFICATION forming part of Letters Patent No. 373,770, dated November 22, 1887.

Application filed April 5, 1887. Serial No. 233,817. (No model.)

*To all whom it may concern:*

Be it known that I, SYLVESTER F. DUNCAN, residing at Chicago, in the county of Cook and State of Illinois, and a citizen of the United States, have invented a new and useful Improved Attaching and Clamping Device, of which the following is a specification, reference being had to the accompanying drawings, in which—

Figure 6:
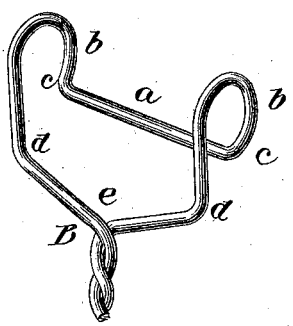
Figure 7:
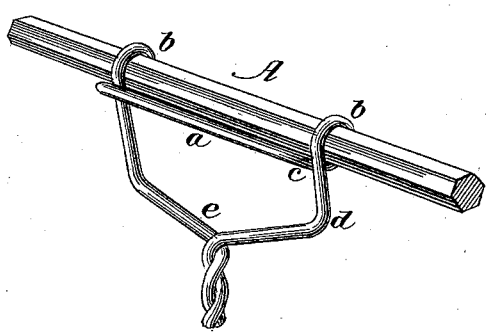
Figure 8:
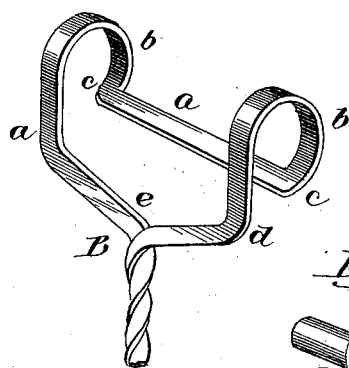
Figure 9:
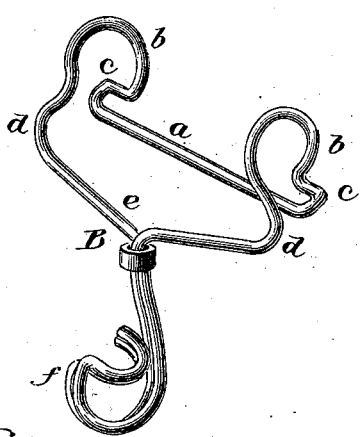
Figure 10:
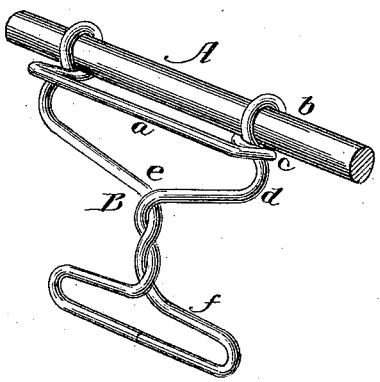

Figure 1 is a perspective view of the device formed for use. Fig. 2 shows the device applied to a flat bar; Fig. 3, a slightly-modified form. Figs. 4 and 5 show the device applied to round and square rods or bars; Fig. 6, another slight modification; Fig. 7, the form shown in Fig. 6 applied to a hexagonal rod or bar. Fig. 8 shows the device formed of flat metal; Fig. 9, another slightly-modified form; Fig. 10, the form shown in Fig. 9 applied to a round rod or wire. Figs. 4, 9, and 10 show the hooks in the form of eyes or loops.

The object of this invention is to provide a device for attaching hooks or cross-strips wires, rods, or bars which can be easily applied, and which will not be subject to lateral movements along the wire or bar to which it is attached, even when not closely clamped, and which will form to a certain extent a self locking or clamping device; and its nature consists in the improvements hereinafter described and claimed as new.

In the drawings, A indicates a fence-wire or other rod or bar to which the device may be applied; B, the device folded or formed so as to produce the bar $a$, bends $b$, $c$, and $d$, the return-bars $e$, and hook or eye $f$.

The device is preferably made of round wire; but it may be made of flat wire or sheet metal, as shown at Fig. 8, and it is formed by commencing at the middle of the piece of wire used in its construction, leaving the bar or portion $a$, with bends $c$ and bends $b$, for passing around the wire or bar, the bends $d$, when the ends are brought together, forming the part $e$, and are then twisted together, so as to form a hook, eye, or loop, $f$. Instead of twisting the ends together, they may be held in place by a collar or ring, as shown in Figs. 4 and 9. Either of the forms shown can be readily attached to a fence-wire or other bar, after such wire or bar has been pot in place, by the use of properly-formed pliers, pinchers, or other suitable tool, and when pressed into position, as shown in Figs. 2, 4, 5, 7, and 10, they will remain in the position in which they are placed without being rigidly attached or soldered, as each end or side attachment forms a lock or clamp for the other side, the device being so formed that a lateral pressure upon the hook in any direction which will tend to move the device lengthwise along the wire or bar will cause one or the other of the parts $b$ to clamp the wire and hold it in position. It will be seen that any side pressure upon either side of the hooks or loops $f$ will cause that portion of the bar $e$ on the side to which the pressure is applied to act as a lever and cause the loop $b$ to clamp the wire, and on the opposite side cause the bend $c$ to lift against the wire and make it clamp the wire or bar A tightly, thus causing it to act as a clamp or lock whenever side pressure is applied. By forming the hook midway between the bends $b$ the tendency to move on the wire or bar under the influence of pressure in the direction of the length of the wire or bar A is also neutralized by the depressing effect upon one of the bends $b$ and the lifting effect upon the other one, so that the effect of said pressure is divided and neutralized.

In the form shown in Figs. 1, 2, 3, 4, 9, and 10 the bend $b$ is so formed as to prevent the opening of the bends $b$ after the device is applied. In some situations this is desirable, while in others it is not important.

In the form shown in Figs. 6, 7, and 8, while the device retains all of its clamping and locking features, it is more easily detached, and in places where it is desirable to move the device it can be more easily done by the form shown in the last-mentioned figures, and the form there shown is also more easily applied to the wire or bar A, as it can, in fact, be applied by hand without the use of special tools; but in principle and operation, when applied, this form does not differ from the others.

These attaching devices are primarily designed for attaching or locking retaining-strips to wire fences, and for this purpose the retaining-strips may be attached to the hooks or loops $f$, or they may be attached to the wire or bar A, in which case this device will hold them in position, and the hooks *f* will pass into or through the body of the strip. As shown, these devices are all pendent; but it will be understood that when used for the upper and lower ends of retaining-strips the under or lower ones will be above instead of below the wire or bar to which they are attached, and it will also be understood that when the ends or parts *f* simply pass into or through returning-strips which are separately attached to the wires or bars the ends *f* need not be formed into hooks. The hook *f*, Fig. 9, is so formed that its end may be placed behind, so as to form a double hook.

What I claim as new, and desire to secure by Letters Patent, is—

1. As an improved article of manufacture, the attaching and clamping hook B, herein described, having the folds or bends for holding the parts together and locking it to a wire or bar, substantially as specified.

2. The hook-clamp B, having the bars *a e* and the bends *b c d*, in combination with the wire or bar A, substantially as specified.

SYLVESTER F. DUNCAN.

Witnesses:
O. W. BOND,
HARRY T. JONES.